United States Patent [19]
Alexander et al.

[11] Patent Number: 5,513,338
[45] Date of Patent: Apr. 30, 1996

[54] APPARATUS FOR TRACING ACTIVITY ON A BUS OF AN IN-CIRCUIT EMULATOR

[75] Inventors: James W. Alexander, Hillsboro; Terri A. Danowski; Stephen J. Peters, both of Aloha; Ronald J. Whitsel, Beaverton, all of Oreg.

[73] Assignee: Intel Corporation, Santa Clara, Calif.

[21] Appl. No.: 30,801

[22] Filed: Mar. 12, 1993

[51] Int. Cl.$^6$ .............................. G06F 11/00; G06F 13/00
[52] U.S. Cl. .................... 395/500; 395/183.19; 395/550
[58] Field of Search ..................... 395/500, 550, 395/183.01, 183.09, 183.15, 183.19; 371/16.2

[56] References Cited

U.S. PATENT DOCUMENTS

| 4,674,089 | 6/1987 | Poret et al. | 371/16.2 |
| 5,313,618 | 5/1994 | Pawloski | 395/500 |

Primary Examiner—Kevin A. Kriess
Assistant Examiner—Dennis M. Butler
Attorney, Agent, or Firm—Owen L. Lamb

[57] ABSTRACT

An in-circuit emulator trace bus clocking mechanism. A synchronization clock associated with the trace bus is provided. Arrival of a first event on a microprocessor bus to be traced is signified by a transition of a control line. A start of cycle event is detected. A start of cycle signal is generated with respect to the start of cycle event. A two stage pipeline having stage 1 storage elements and stage 2 storage elements are connected to receive data from the microprocessor bus. The start of cycle signal is used to sample data from the microprocessor bus into the stage 1 storage elements. An end of cycle event is detected. An end of cycle signal is generated with reference to the end of cycle event. The end of cycle signal is used to sample data from the stage 1 storage elements into the stage 2 storage elements. The end of cycle signal is also used to sample data appearing on the microprocessor bus at the end of the cycle into the stage 2 storage elements. The synchronization clock is combined with the end of cycle signal to generate a trace bus valid signal.

24 Claims, 3 Drawing Sheets

APPARATUS FOR TRACING ACTIVITY ON A BUS OF AN IN-CIRCUIT EMULATOR

BACKGROUND OF THE INVENTION

1. Field of the Invention

The present invention is related to data processing systems and more specifically to apparatus for tracing activity on a bus of an in-circuit emulator.

2. Prior Art

An in-circuit emulator (ICE) duplicates and imitates the behavior of a chip it emulates by using programming techniques and special machine features to permit the ICE to execute micro code written for the chip that it imitates. Microprocessors each have their own reference clocks that provide timings for internal operations. Data and memory addresses are output to an information interchange bus for each microprocessor. In some configurations, two microprocessor information interchange buses share the same address and data lines, but the buses are timing related to the two mutually asynchronous reference clocks. To test the operation of this configuration it is desirable that the contents of the two information interchange buses be multiplexed onto the same logic-analyzer trace bus in order to minimize the required number of logic analyzer trace signals.

Events appear on the information interchange bus. The arrival times of these events are not synchronized to any single clock. In fact, several agents (microprocessors), each synchronized to a different clock frequency, can output events to the bus. The frequency of operation of each microprocessor can change dynamically, such that no one microprocessor always runs faster than all of the other microprocessors.

The arrival of each event from a microprocessor is signified by a transition of a control line dedicated to that event. A separate set of control lines is dedicated to each microprocessor. Thus, microprocessor #1 generates event #1 which is signified by a transition of control line #1. Each microprocessor can generate more than one kind of event. Each different kind of event for each microprocessor is signified by a transition of a dedicated control line for that event. Thus, microprocessor #1 also generates event #2 which is signified by a transition of control line #2.

Each event is valid only for a given setup time before and a given hold time after a transition of its dedicated control line. Thus, event #1 is valid only for a given setup 1 time (setup #1) before and a given hold time (hold #1) after a transition of control line #1. Event #2 is valid only for a given setup time (setup #2) before and a given hold time (hold #2) after a transition of control line #2. All events must be transferred coherently from the asynchronous microprocessor bus to the synchronous trace bus. Arrival of events on synchronous bus trace is indicated by a level on a control line (trace bus valid).

Neither reference clock can be used to capture both information interchange buses because neither bus can be guaranteed to always operate at a frequency greater than or equal to the other bus. Also, the references clocks will not be cleanly time-multiplexed, since suitable simulation tools to prove absence of glitches during transition from the information interchange to the trace bus are not available. The trace bus clock must be asynchronous to the other two reference clocks, and that a suitable de-metastabilizing circuit must be provided that will coherently capture the contents of either microprocessor bus It is therefore desirable to provide an in-circuit emulator in which the contents of two microprocessor interchange buses which share the same address and data lines but are time-related to two mutually asynchronous clocks, are multiplexed onto the same logic analyzer trace bus of an in-circuit emulator.

SUMMARY OF THE INVENTION

Briefly, the above object is accomplished in accordance with the invention by providing a synchronization clock associated with a trace bus. Arrival of a first event on a microprocessor bus to be traced is signified by a transition of a control line. A start of cycle event is detected. A start of cycle signal is generated with respect to the start of cycle event. A two stage pipeline having stage 1 storage elements and stage 2 storage elements are connected to receive data from the microprocessor bus. The start of cycle signal is used to sample data from the microprocessor bus into the stage 1 storage elements. An end of cycle event is detected. An end of cycle signal is generated with reference to the end of cycle event. The end of cycle signal is used to sample data from the stage 1 storage elements into the stage 2 storage elements. The end of cycle signal is also used to sample data appearing on the microprocessor bus at the end of the cycle into the stage 2 storage elements. The synchronization clock is combined with the end of cycle signal to generate a trace bus valid signal.

An advantage of this invention is that the sample rate (the frequency of the trace clock) is not primarily a function of the minimum data valid time, but is instead primarily a function of the metastability characteristics of the registers used in the implementation, the minimum period between the information interchange bus events, and the desired maximum soft-error rate of the product.

The foregoing and other features, and advantages of the invention will be apparent from the following more particular description of a preferred embodiment of the invention as illustrated in the accompanying drawings.

DESCRIPTION OF THE PREFERRED EMBODIMENT

Figure 1:
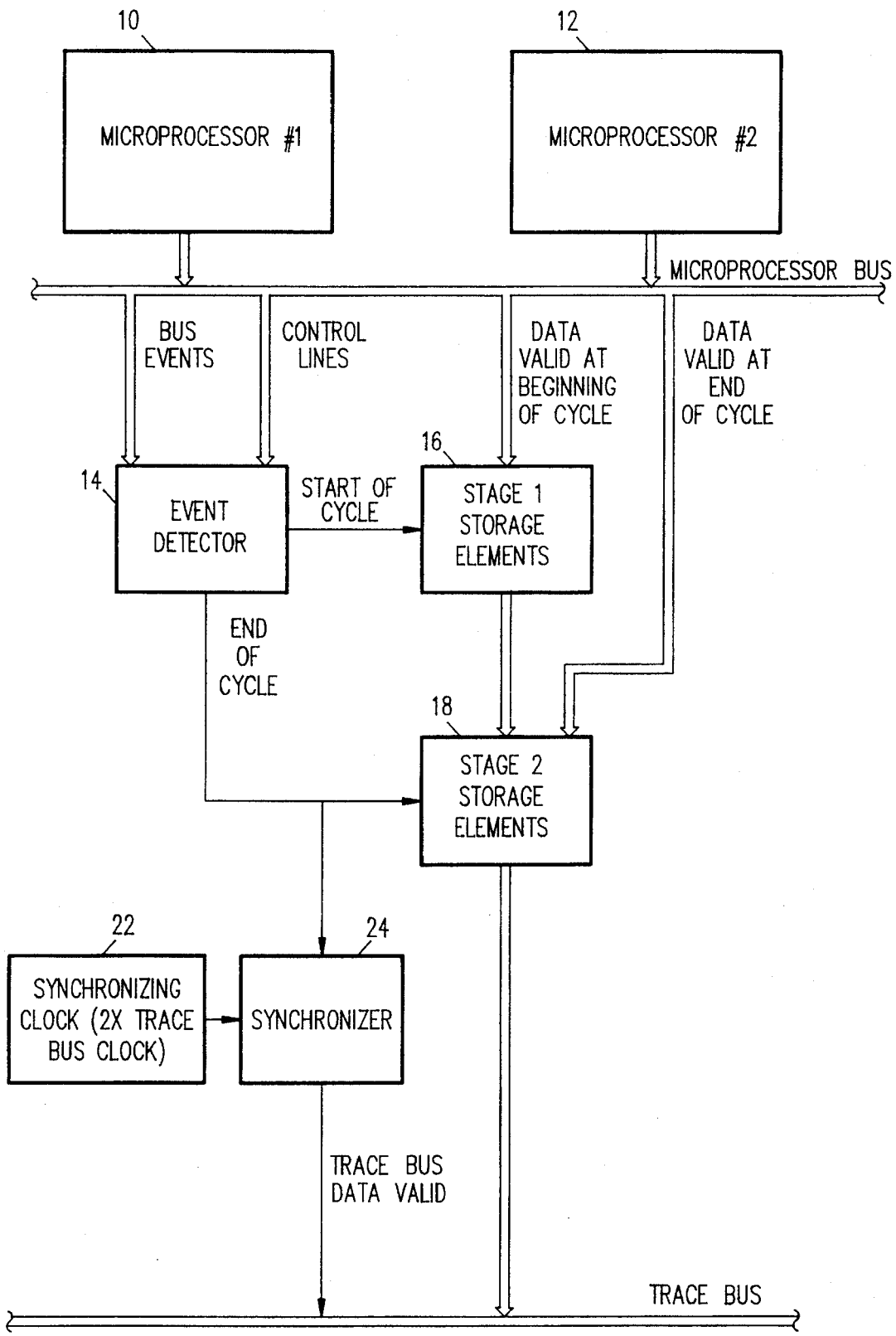
FIG. 1 is a functional block diagram of a microprocessor emulator in which the present invention is embodied.

FIG. 1 is a block diagram of a portion of a microprocessor emulator in which the present invention is embodied. Microprocessor #1 (10) and microprocessor #2 (12) are connected to a microprocessor bus. Event detectors (14) and stage 1 storage elements are connected to the microprocessor bus. The event detector generates a Start of Cycle signal and an End of Cycle signal. Inputs to the stage 2 storage elements are connected to the outputs of the stage 1 storage elements and to the microprocessor bus. The outputs of stage 2 storage elements are connected to the trace bus. A synchronizing clock (22), which runs at two times the trace bus clock, is provided. The synchronizing clock (22) drives a synchronizer (24). Synchronizer (24) generates a trace bus valid signal which, when active, indicates that the data supplied to the trace bus is valid and stable.

The start of data transfer on the microprocessor bus is recognized by an event on that bus, usually a transition of a control line from inactive to active. The event is recognized by the event detector (14) and is used to generate the Start of Cycle signal. The start of cycle signal is used to sample data from the microprocessor bus 1 to the stage 1 storage elements (16) which comprise a latch or register for each microprocessor bus line that is to be captured.

If the data to be sampled from the microprocessor bus are valid only at the beginning of the data transfer cycle, the data lines are sampled once by the Start of Cycle control line into the stage 1 storage elements (16) at the beginning of the data transfer cycle.

If the data to be sampled from the microprocessor bus are valid at times later in the data transfer cycle, the data lines are sampled continuously throughout the data transfer cycle. A second event on the microprocessor bus signals the end of the data transfer cycle. This second event is recognized by the event detectors (14) which generates an End of Cycle signal. The End of Cycle signal is used to asynchronously gate the data in the stage 1 storage elements (16) into the stage 2 storage elements (18). The End of Cycle signal is also used to sample the microprocessor bus to capture data that becomes valid at the end of the data transfer cycle. The stage 2 storage elements are output to the logic analyzer trace bus. This End of Cycle signal is synchronized to the logic analyzer trace bus clock (22). The synchronizer (24) generates the Trace Bus Data Valid signal which indicates that the data from the stage 2 storage elements at the trace bus are valid and stable, synchronously with the trace bus clock.

The End of Cycle signal performs two functions. First, it transfers data from the stage 1 storage elements to the stage 2 storage elements. Second, it captures data on the microprocessor bus that becomes available only at the end of the data transfer cycle.

Figure 2:
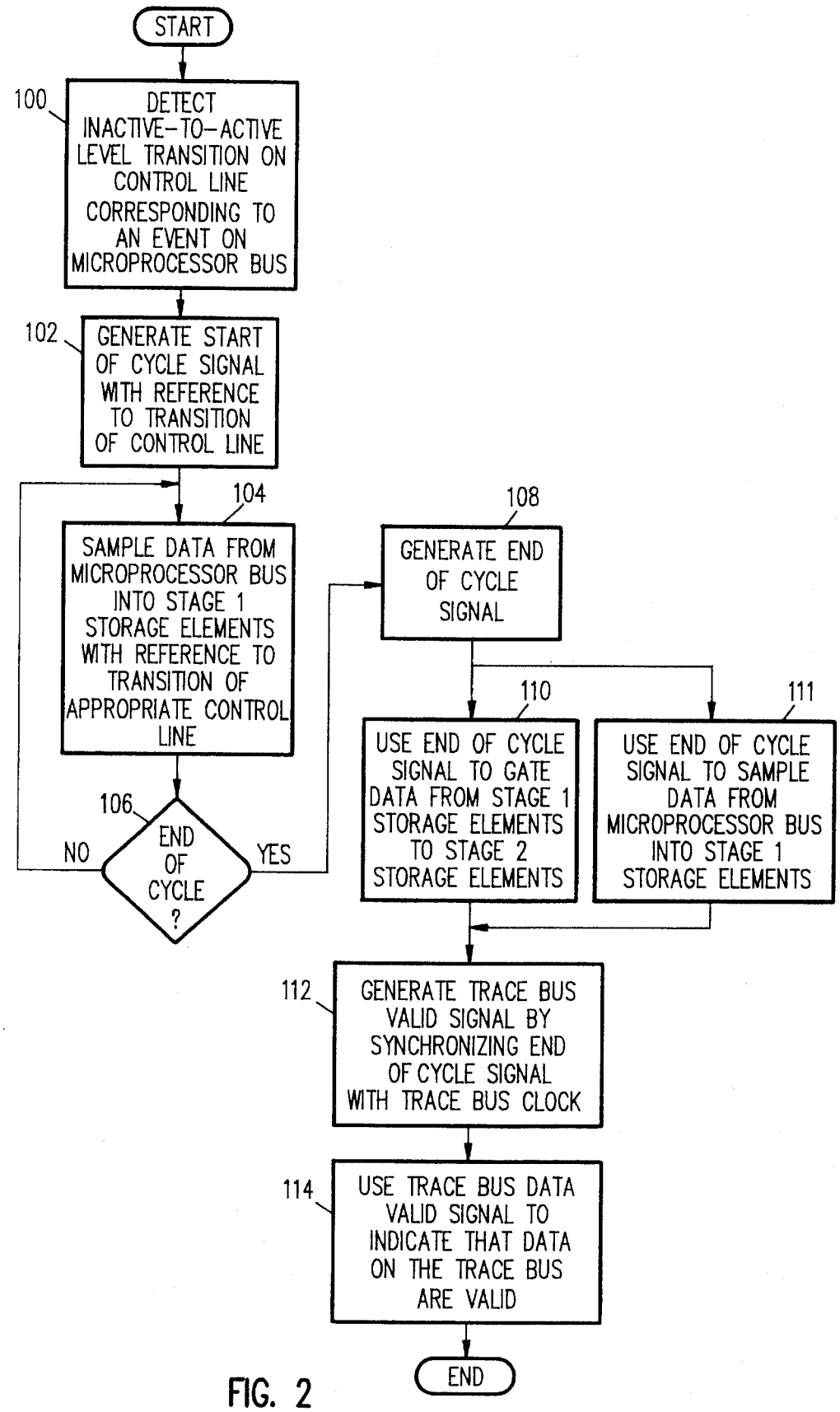
FIG. 2 is a flow chart of the operation of the logic of FIG. 1.

Refer now to FIG. 2 which is a flow chart which illustrates the operation of the logic in FIG. 1 and describes the method used for detecting valid data.

At block (100) the logic detects an inactive-to-active level transition on a control line corresponding to a a first event on the microprocessor bus. At block (102) the logic generates a Start of Cycle signal with reference to the transition of the dedicated control line for that first event. This marks the beginning of a data transfer cycle.

At block (104) the logic samples data from the microprocessor bus into the stage 1 storage elements with reference to the appropriate dedicated control line for the bus line being sampled. At block (106) when the event detectors logic detects an inactive-to-active level transition on a control line corresponding to a last event on the microprocessor bus, it generates an End of Cycle signal (108). Until this End of Cycle is detected the data is continuously sampled (104).

At block (110) the End of Cycle signal is used to gate data from the stage 1 storage elements to the stage 2 storage elements. The End of Cycle signal is combined with the trace bus clock in the synchronizer which generates the Trace Bus Sample signal (112). At block (114) the Trace Bus Sample signal is used to indicate that data from the stage 2 storage elements available at the trace bus is stable and valid, and the process ends.

Figure 3:
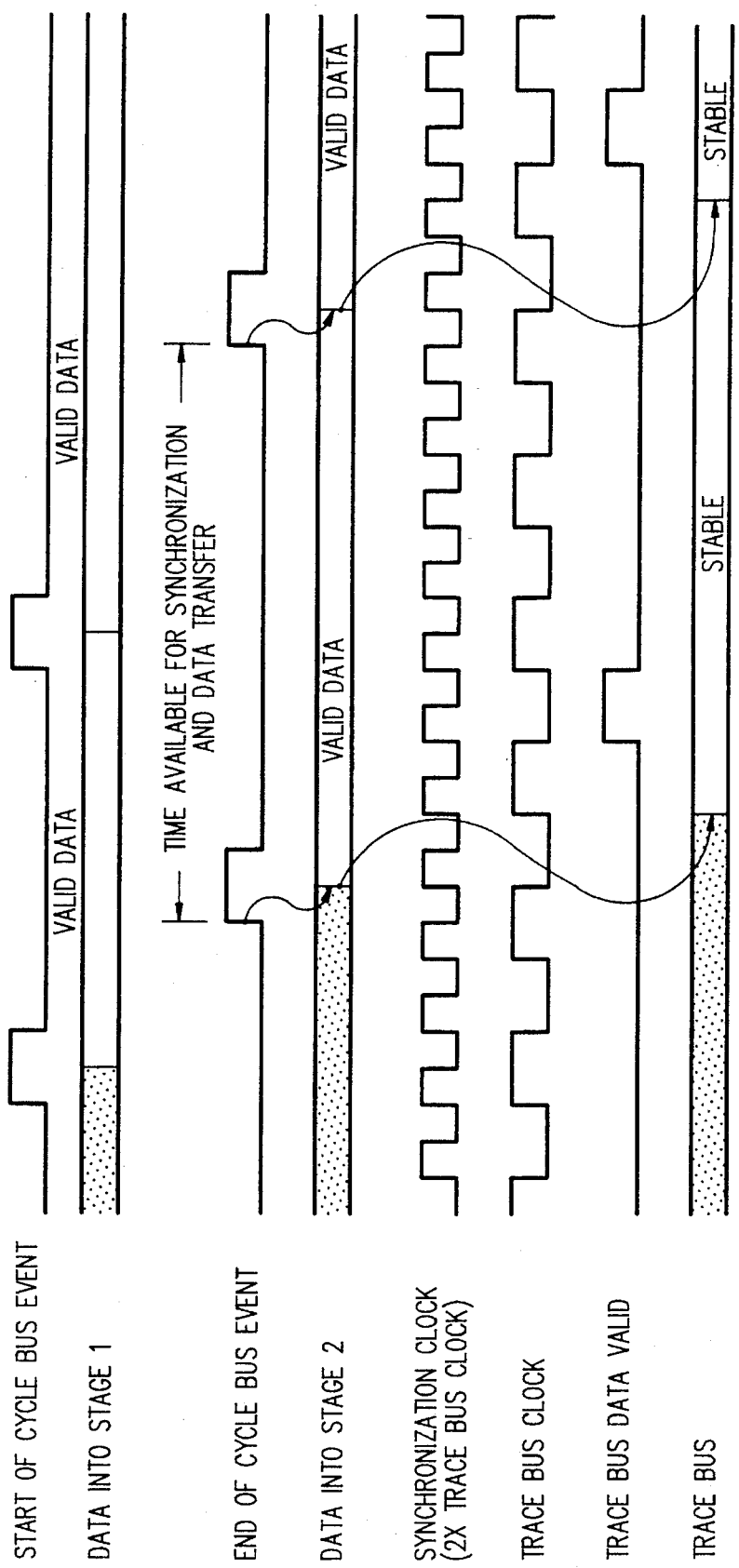
FIG. 3 is a timing diagram of the operation of the logic shown in FIG. 1.

The circuits of FIG. 1 will now be described in more detail and with reference to FIG. 3 which is a timing diagram of the operation of the logic shown in FIG. 1. The timing diagram shows two back-to-back data transfers which occur asynchronously with reference to the trace bus clock. The synchronization clock is twice the trace bus clock that is distributed to the rest of the system. The minimum synchronization clock frequency is determined by the time between end of cycle bus events and the number of synchronization stages (Stage 1, stage 2). The trace bus clock runs at a sub-multiple of this frequency, thus reducing the clocking requirements provided to other logic in the system.

The advantage of this invention is that the sample rate (frequency of the synchronizing clock) is not primarily a function of the minimum data valid time, but is instead primarily a function of the metastability characteristics of the registers used in the implementation, the minimum period between microprocessor bus events, and the desired maximum soft-error rate of the product.

For the preceding example, it can be shown that a synchronizing clock rate of 29.5 MHz is sufficient, using metastability characteristics available in typical 1 micron geometry Complementary Metal Oxide Semiconductor Field Programmable Gate Arrays with a maximum tolerable rate of one soft error per 10,000 hours. Since the invention uses a novel two-step approach to sampling, then the utilization of the trace bus is minimized, in fact, is one-for-one with corresponding events on the microprocessor bus.

Using a two-step approach to sampling provides the greatest efficiency. The data on the microprocessor bus must be sampled by a command to maintain bus coherency. Then the transition of the control line corresponding to the command is stabilized to the trace bus clock through the pipeline of synchronizing registers. The number of stages in the pipeline is a function of the trace bus clock speed, the minimum period between microprocessor bus events, the metastability characteristics of the synchronizing registers, and the maximum tolerable soft error rate.

In accordance with the invention, the synchronizing pipeline is clocked at twice the trace bus clock rate in order to tolerate a smaller minimum period between microprocessor bus events, yet using the normal speed trace bus clock rate in order to minimize the frequency of the bus. This is effective since a very small amount of logic on one die implements the required the doubled clock rate, but a very large multiple-die system spanning multiple circuit boards and cables is clocked by the slower trace bus clock rate. It is also effective because the required metastability characteristics of the synchronizer are adequate with a very short pipeline, even though the synchronizing frequency is very high. Generally, the higher the synchronizing frequency, the longer the required pipeline needed to meet a given soft error rate.

The invention is used to trace the PI/ISA bus of the Intel "SL" family of In Circuit Emulators. The invention can also be used in multi-master asynchronous bus event capture schemes allowing a "snooper" to process bus traffic occurring at short but irregular intervals, requiring implementation using pipelining techniques, hence imposing an internal fixed frequency clock analogous to the trace bus clock.

While the invention has been particularly shown and described with reference to preferred embodiments thereof, it will be understood by those skilled in the art that the foregoing and other changes in form and detail may be made therein without departing from the scope of the invention.

What is claimed is:

1. In a data processing system including a microprocessor bus having data thereon;

a trace bus;

a trace bus clock associated with said trace bus;

said trace bus clock operating a predetermined frequency;

a control line;

an event detector connected to said microprocessor bus and to said control line;

arrival of a first event on said microprocessor bus being signified by a transition of said control line, stage 1 storage elements connected to said event detector and to said microprocessor bus; and stage 2 storage elements connected to said event detector, to said stage 1 storage elements, and to said trace bus;

a method of tracing event activity on said microprocessor bus comprising steps of:
- A. detecting at said event detector a start of cycle event on said microprocessor bus;
- B. generating at said event detector a start of cycle signal with reference to said start of cycle event;
- C. writing said data on said microprocessor bus into said stage 1 storage elements in response to said start of cycle signal;
- D. detecting at said event detector an end of cycle event on said microprocessor bus;
- E. generating at said event detector an end of cycle signal with reference to said end of cycle event;
- F. writing data that is stored in said stage 1 storage elements into said stage 2 storage elements in response to said end of cycle signal;
- G. providing a synchronizing clock operating at a synchronizing clock frequency that is a multiple of said predetermined frequency; and,
- H. combining said synchronizing clock with said end of cycle signal to generate a trace bus valid signal.

2. The method in accordance with claim 1 wherein said stage 2 storage elements are connected to said microprocessor bus, said method further comprising steps of:
- I. using said end of cycle signal to sample data from said microprocessor bus into said stage 2 storage elements.

3. The method in accordance with claim 1 wherein said synchronizing clock frequency is twice said predetermined frequency.

4. The method in accordance with claim 2 wherein said synchronizing clock frequency is twice said predetermined frequency.

5. A data processing system comprising:

a microprocessor bus;

a trace bus;

a trace bus clock associated with said trace bus;

said trace bus clock operating a predetermined frequency;

a synchronizing clock;

said synchronizing clock operating at a synchronizing clock frequency that is a multiple of said predetermined frequency;

a control line;

event detector means connected to said microprocessor bus and to said control line;

arrival of a first event on said microprocessor bus being signified by a transition of said control line, stage 1 storage elements connected to said microprocessor bus and to said event detector means; and, stage 2 storage elements connected to said event detector means, to said stage 1 storage elements, and to said trace bus;

said event detector means including first means for detecting a start of cycle event on said microprocessor bus;

said event detector means including second means connected to said first means for generating a start of cycle signal with reference to said start of cycle event;

third means connected to said second means and to said first storage elements for using said start of cycle signal to sample data from said microprocessor bus into said stage 1 storage elements;

fourth means for detecting an end of cycle event on said microprocessor bus;

fifth means for generating an end of cycle signal with reference to said end of cycle event;

sixth means connected to said fifth means and to said stage 2 storage elements for using said end of cycle signal to sample data from said stage 1 storage elements into said stage 2 storage elements; and, seventh means connected to said synchronizing clock and to said fourth means for combining said synchronizing clock with said end of cycle signal to generate a trace bus valid signal.

6. The apparatus in accordance with claim 5 wherein said stage 2 storage elements are connected to said microprocessor bus and said sixth means includes eighth means for using said end of cycle signal to sample data from said microprocessor bus into said stage 2 storage elements.

7. The apparatus in accordance with claim 6 wherein said synchronizing clock frequency is twice said predetermined frequency.

8. The apparatus in accordance with claim 5 wherein said synchronizing clock frequency is twice said predetermined frequency.

9. A data processing system comprising:

a microprocessor bus having data thereon;

a trace bus;

a trace bus clock associated with said trace bus;

said trace bus clock operating a predetermined frequency:

a synchronizing clock;

said synchronizing clock operating at a synchronizing clock frequency that is a multiple of said predetermined frequency;

a control line;

an event detector connected to said microprocessor bus and to said control line;

arrival of a first event on said microprocessor bus being signified by a transition of said control line, stage 1 storage elements connected to said microprocessor bus and to said event detector; and, stage 2 storage elements connected to said event detector and to said stage 1 storage elements:

said event detector detecting a start of cycle event on said microprocessor bus;

said event detector generating a start of cycle signal with reference to said start of cycle event;

said stage 1 storage elements writing said data on said microprocessor bus into said stage 1 storage elements in response to said start of cycle signal;

said event detector detecting an end of cycle event on said microprocessor bus;

said event detector generating an end of cycle signal with reference to said end of cycle event;

said stage 2 storage elements writing said data from said stage 1 storage elements into said stage 2 storage elements in response to said start of cycle signal; and, a synchronizer connected to said synchronizing clock and to said event detector for combining said synchronizing clock with said end of cycle signal to generate a trace bus valid signal.

10. The apparatus in accordance with claim 9 wherein
said stage 2 storage elements are connected to said microprocessor bus; and,
said stage 2 storage elements writes data from said microprocessor bus into said stage 2 storage elements in response to said end of cycle signal.

11. The apparatus in accordance with claim 10 wherein said synchronizing clock frequency is twice said predetermined frequency.

12. The apparatus in accordance with claim 9 wherein said synchronizing clock frequency is twice said predetermined frequency.

13. In a data processing system including a first microprocessor and a second microprocessor
a microprocessor bus connected to said first microprocessor and to said second microprocessor;
said microprocessor bus having data thereon;
a trace bus;
a trace bus clock associated with said trace bus;
said trace bus clock operating a predetermined frequency;
a first control line associated with said first microprocessor;
a second control line associated with said second microprocessor;
an event detector connected to said microprocessor bus, to said first control line and to said second control line;
arrival of a first event associated with said first microprocessor on said microprocessor bus being signified by a transition of said first control line,
arrival of a second event associated with said second microprocessor on said microprocessor bus being signified by a transition of said second control line;
stage 1 storage elements connected to said event detector and to said microprocessor bus; and
stage 2 storage elements connected to said event detector, to said stage 1 storage elements, and to said trace bus;
a method of tracing event activity on said microprocessor bus comprising steps of:
A. detecting at said event detector a start of cycle event on said microprocessor bus;
B. generating at said event detector a start of cycle signal with reference to said start of cycle event;
C. writing said data on said microprocessor bus into said stage 1 storage elements in response to said start of cycle signal;
D. detecting at said event detector an end of cycle event on said microprocessor bus;
E. generating at said event detector an end of cycle signal with reference to said end of cycle event;
F. writing data that is stored in said stage 1 storage elements into said stage 2 storage elements in response to said end of cycle signal;
G. providing a synchronizing clock operating at a synchronizing clock frequency that is a multiple of said predetermined frequency; and,
H. combining said synchronizing_clock with said end of cycle signal to generate a trace bus valid signal.

14. The method in accordance with claim 13 wherein said synchronizing clock frequency is twice said predetermined frequency.

15. The method in accordance with claim 13 said stare 2 storage elements are connected to said microprocessor bus, said method further comprising steps of:
I. using said end of cycle signal to sample data from said microprocessor bus into said stage 2 storage elements.

16. The method in accordance with claim 15 wherein said synchronizing clock frequency is twice said predetermined frequency.

17. A data processing system comprising:
a first microprocessor;
a second microprocessor;
a microprocessor bus;
a trace bus;
a trace bus clock associated with said trace bus;
said trace bus clock operating a predetermined frequency;
a synchronizing clock;
said synchronizing clock operating at a synchronizing clock frequency that is a multiple of said predetermined frequency;
a first control line associated with said first microprocessor;
a second control line associated with said second microprocessor;
event detector means connected to said microprocessor bus, to said first control line and to said second control line;
arrival of a first event on said microprocessor bus being signified by a transition of said first control line,
arrival of a second event associated with said second microprocessor on said microprocessor bus being signified by a transition of said second control line,
stage 1 storage elements connected to said microprocessor bus and to said event detector means;
stage 2 storage elements connected to said event detector means and to said stage 1 storage elements;
said event detector means including first means for detecting a start of cycle event on said microprocessor bus;
said event detector means including second means connected to said first means for generating a start of cycle signal with reference to said start of cycle event;
third means connected to said first means and to said first storage elements for using said start of cycle signal to sample data from said microprocessor bus into said stage 1 storage elements;
fourth means for detecting an end of cycle event on said microprocessor bus;
fifth means for generating an end of cycle signal with reference to said end of cycle event;
sixth means connected to said fifth means and to said stage 2 storage elements for using said end of cycle signal to sample data from said stage 1 storage elements into said stage 2 storage elements; and,
seventh means connected to said synchronizing clock and to said fourth means for combining said synchronizing clock with said end of cycle signal to generate a trace bus valid signal, said trace bus valid signal being synchronized with said bus clock.

18. The method in accordance with claim 17 wherein said synchronizing clock frequency is twice said predetermined frequency.

19. The apparatus in accordance with claim 17 wherein said sixth means includes eighth means for using said end of cycle signal to sample data from said microprocessor bus into said stage 2 storage elements.

20. The method in accordance with claim 19 wherein said synchronizing clock frequency is twice said predetermined frequency.

21. A data processing system comprising:

a first microprocessor;

a second microprocessor;

a microprocessor bus connected to said first microprocessor and to said second microprocessor;

said microprocessor bus having data thereon;

a trace bus;

a trace bus clock associated with said trace bus;

said trace bus clock operating a predetermined frequency;

a synchronizing clock;

said synchronizing clock operating at a synchronizing clock frequency that is a multiple of said predetermined frequency;

a first control line;

a first control line associated with said first microprocessor;

a second control line associated with said second microprocessor;

an event detector connected to said microprocessor bus, to said first control line and to said second control line;

arrival of a first event associated with said first microprocessor on said microprocessor bus being signified by a transition of said first control line;

arrival of a second event associated with said second microprocessor on said microprocessor bus being signified by a transition of said second control line;

stage 1 storage elements connected to said microprocessor bus and to said event detector; and, stage 2 storage elements connected to said event detector and to said stage 1 storage elements;

said event detector detecting a start of cycle event on said microprocessor bus;

said event detector generating a start of cycle signal with reference to said start of cycle event;

said stage 1 storage elements writing said data on said microprocessor bus into said stage 1 storage elements in response to said start of cycle signal;

said event detector detecting an end of cycle event on said microprocessor bus;

said event detector generating an end of cycle signal with reference to said end of cycle event;

said stage 2 storage elements writing said data from said stage 1 storage elements into said stage 2 storage elements in response to said start of cycle signal; and, a synchronizer connected to said synchronizing clock and to said event detector for combining said synchronizing clock with said end of cycle signal to generate a trace bus valid signal.

22. The method in accordance with claim 21 wherein said synchronizing clock frequency is twice said predetermined frequency.

23. The apparatus in accordance with claim 21 wherein said stage 2 storage elements are connected to microprocessor bus; and, said stage 2 storage elements writes data from said microprocessor bus into said stage 2 storage elements in response to said end of cycle signal.

24. The method in accordance with claim 23 wherein said synchronizing clock frequency is twice said predetermined frequency.

\* \* \* \* \*

UNITED STATES PATENT AND TRADEMARK OFFICE
CERTIFICATE OF CORRECTION

PATENT NO. : 5,513,338
DATED : April 30, 1996
INVENTOR(S) : Alexander, et al.

It is certified that error appears in the above-identified patent and that said Letters Patent are hereby corrected as shown below:

```
Column 6, claim 9, line 18, change "elements:" to --elements;--
Column 7, claim 15, line 1, change "stare 2" to --stage 2--;
```

Signed and Sealed this

Ninth Day of July, 1996

Attest:

BRUCE LEHMAN

*Attesting Officer*     *Commissioner of Patents and Trademarks*